UNITED STATES PATENT OFFICE.

JAMES COLTER, OF DURHAMVILLE, NEW YORK.

REMEDY FOR COUGHS OF HORSES.

No. 900,484.

Specification of Letters Patent.

Patented Oct. 6, 1908.

Application filed May 4, 1908. Serial No. 430,880.

*To all whom it may concern:*

Be it known that I, JAMES COLTER, a citizen of the United States, and resident of Durhamville, in the county of Oneida, in the State of New York, have invented new and useful Improvements in Composition of Matter to be Used as a Remedy for Coughs of Horses, of which the following is a full, clear, and exact description.

My composition consists of the following ingredients, combined in the proportions stated, viz:

| | |
|---|---|
| Spirits of niter | 2 ounces. |
| Spirits of turpentine | 2 " |
| Sulfur | 2 " |
| Animal skunk-oil | 6 " |
| Pumpkinseed oil | 6 " |
| Kerosene | 6 " |

These ingredients are to be thoroughly mingled by agitation. The mixing of the said ingredients is facilitated by moderately heating the same.

The compound is to be used internally and to be given in doses of about one-half pint at intervals of about twelve hours. Its effect has proved it to be a positive remedy for coughs of horses.

I claim:

The herein-described composition of matter, consisting of spirits of niter, spirits of turpentine, sulfur, animal skunk-oil, pumpkinseed oil, and kerosene substantially as described and for the purpose specified.

JAMES COLTER. [L. S.]

Witnesses:
 JOSEPH BEAL,
 WM. F. SANTRY.